United States Patent Office 2,887,026
Patented May 19, 1959

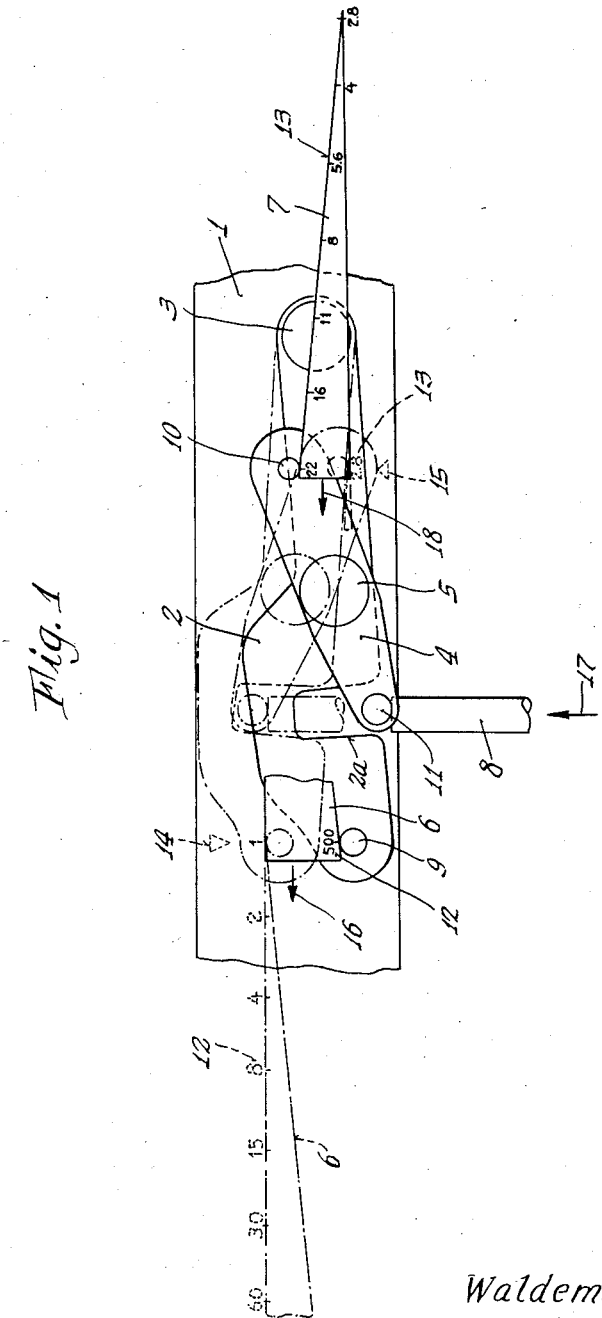

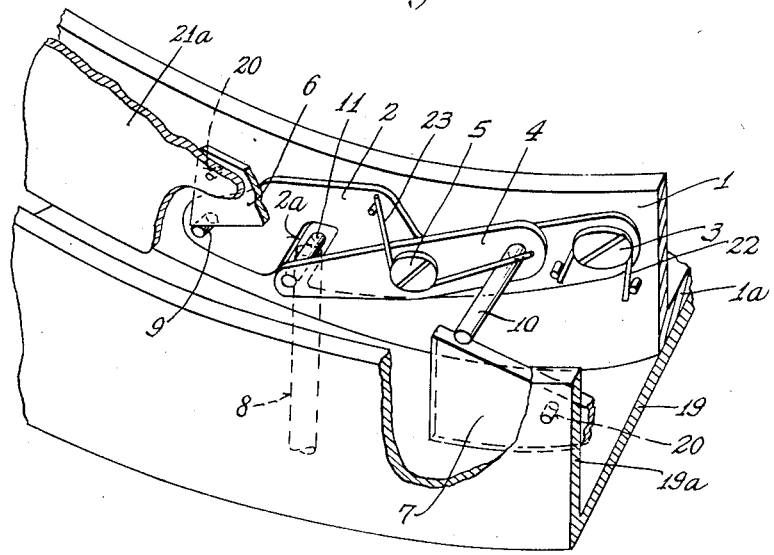

2,887,026

ADJUSTABLE CAMERA STRUCTURE AND COUPLED EXPOSURE METER

Waldemar T. Rentschler, Calmbach (Enz), Germany, assignor to Alfred Gauthier G.m.b.H., Calmbach (Enz), Germany, a corporation of Germany Application February 13, 1957, Serial No. 639,986

Claims priority, application Germany May 5, 1956

10 Claims. (Cl. 95—10)

This invention relates to photographic cameras, and more particularly to cameras having adjustable shutter structures and exposure meters coupled therewith.

In the past there have been various proposals for coupling a photographic intra-lens shutter to an exposure meter in a manner that adjustment of the time-diaphragm proportion at the shutter in accordance with the exposure meter indication was effected through the medium of a coupling between the exposure meter tracing member and the diaphragm and shutter-speed setting members.

In these prior proposals the coupling between the tracing member of the meter and the said setting members was done either by a differential drive mechanism or by means of turnable and axially shiftable rings coaxially arranged about the shutter structure.

In these prior proposals parts were utilized which could not be most economically produced, since for one thing they required the holding of close tolerances. Moreover, such prior proposals involved additional components which represented an appreciable material expense, this being also undesirable.

The above disadvantages and drawbacks of these prior camera structures are obviated by the present invention, and one object of the invention is to provide in a photographic camera, a novel and improved shutter structure and associated exposure meter of the type providing semi-automatic adjustment of shutter speed and diaphragm in accordance with meter indications, characterized by a novel and improved coupling device between the setting members of the shutter structure and the tracing member of the exposure meter, which device has simply-mounted parts adapted to be easily and economically produced, and which additionally may be readily mounted and arranged at or in the shutter structure, said coupling device further providing reliable operation throughout an extended period of use, as well as high accuracy.

In accordance with the invention, this is accomplished by the provision of a first lever securely pivoted on the shutter structure, preferably at a side wall of the housing thereof, said first lever pivotally carrying in turn a second lever which is arranged to actuate the tracing member of the exposure meter. Additionally, each of the two levers cooperates with a different cam, one cam being connected with the diaphragm setting member of the shutter structure and the other cam being connected with the shutter-speed setting member.

The novel coupling structure of this invention has an especial advantage in that the parts or components cooperating with the controlling means of the setting member, and also with the tracing member of the exposure meter, may be produced as sheet metal stampings. Thus it is possible to effect a specific economy in manufacture while at the same time obtaining high accuracy of the components.

By utilizing levers as some of the components there is effected an appreciable saving of space, and also an economy in the use of material, as compared with prior coupling devices comprising turnable and axially shiftable rings.

Moreover, the rigid pivotal mounting of the levers enables a high degree of accuracy to be obtained in conjunction with the controlling cams connected to the diaphragm and shutter-speed setting members, since these setting members themselves are accurately positioned and held. In consequence of this, there exists accurate spacing between the setting members and the levers, making for accuracy in the functioning of the levers in response to movement of the cams carried by the members.

The coupling device of the present invention may be utilized without requiring existing space in the shutter which was heretofore utilized by the said prior devices; moreover, with the present improved coupling a closed appearance of the shutter may be had when the setting members for the diaphragm and shutter speed are constituted as rings arranged coaxially with respect to the axis of the shutter housing and disposed respectively at the front and rear thereof. For this purpose, the said rings may be provided with cylindrical mantles overlying the circumference of the shutter structure, and cams carried by the setting rings and cooperating with the said two levers may be disposed in the space between the said cylindrical mantles and the side wall of the shutter housing.

Other features and advantages will hereinafter appear.

In the drawings accompanying this specification, similar characters of reference indicate corresponding parts wherever possible in the several views, in which:

Figure 1 is a diagrammatic showing of the coupling device of the invention, illustrating the arrangement of two levers and the driving connection thereof to the exposure meter. Also illustrated are the controlling cams connected with the diaphragm setting member and shutter-speed setting member.

Fig. 2 is a fragmentary perspective view of the coupling device disposed at the circumference of the intra-lens shutter structure.

Fig. 3 is a schematic top view of a photographic camera with intra-lens shutter and exposure meter, the latter being coupled with the shutter setting members by the present improved coupling device.

Referring to Fig. 1, the side wall of the housing of the shutter structure is indicated by the numeral 1. By the present invention there is pivotally mounted on the side wall 1 a first lever 2, carried by an axis 3 secured rigidly to the side wall 1. The lever 2 carries a second lever 4 which is pivotally movable about an axis 5 fixed to the lever 2.

The first lever 2 cooperates with a controlling cam 6 (shown also in broken outline in a different position), the cam 6 being connected with a shutter-speed setting member in the form of a ring 21 (not shown in Fig. 1). Cooperable with the second lever 4 is a controlling cam 7 connected with a diaphragm setting member in the form of a ring 19 (not shown in Fig. 1 for reasons of clarity).

By the present invention the second lever 4 is adapted to actuate the tracing member of the exposure meter (not shown in Fig. 1), through the medium of an axially shiftable transmission pin 8 movably mounted on the camera structure so as to be parallel with the shutter axis, as will be later described in detail.

The levers 2 and 4 may be constituted either as one-armed levers or two-armed levers. However, in the specific embodiment of the invention illustrated herein the lever 2 is formed as a one-armed lever, whereas the lever 4 is constituted as a two-armed lever. This particular organization makes for relatively small dimensions of the levers, and also enables the same to advantageously cooperate with the controlling cams 6 and 7 of the setting rings and with the transmission pin 8 leading to the exposure meter.

In Fig. 1 the arrangement and proportions of the levers 2 and 4 are such that the controlling cams 6 and 7 may both have the same pitch. Thus the fabrication of the cams is simplified, effecting a desirable economy of manufacture.

For the purpose of enabling the levers 2 and 4 to readily respond to movement of the cams 6 and 7, the levers are provided respectively with follower pins 9 and 10, such pins by virtue of their rounded or cylindrical surfaces enabling the levers to respond with a minimum of friction. In connection with this, the surfaces of the pins 9 and 10 as well as the working edges of the cams 6 and 7 may be highly finished and brightly polished, and said pins and cams may be made of abrasion-resistant material.

Also, in accordance with the invention, I provide a low friction connection between the lever 4 and the transmission pin 8 in the form of a cylindrical pin 11 fixedly attached to the lever.

In Fig. 1 the levers 2 and 4 are shown in full-line positions as effected by engagement with the highest portions of the cams 6 and 7, and are also shown in broken line positions, as effected by engagement with the lowest portions of the cams. The highest exposure value is represented by the full-line positions of the cams and levers, and the lowest exposure value by the broken line positions of the cams and levers.

In the specific illustrated embodiment of the invention shown herein, the shutter has been assumed to have a speed scale of from one to $\frac{1}{500}$ sec., and to allow diaphragm adjustment between values from 2.8 to 22. The graduation of speed as well as diaphragm values has been done according to a geometrical range, with a factor of two.

For the purpose of showing the coordination of the time and diaphragm marks to the respective portions of the controlling cams, the cam 6 is indicated as having a speed marking at the location 12 corresponding to a diaphragm marking at the location 13 on the cam 7. Index marks 14 and 15 are indicated, in broken outline, which may be used as reference points in conjunction with the locations 12 and 13.

In accordance with the above organization, the greatest exposure value (time-diaphragm-proportion) is obtained by the setting of $\frac{1}{500}$ sec. shutter speed, with a diaphragm opening of 22, whereas the lowest exposure value is obtained with a setting of one second shutter speed and a diaphragm opening of 2.8.

Operation of the improved coupling device shown diagrammatically in Fig. 1 is as follows:

When the cam 7 is in its full-line position and the cam 6 is shifted from its full-line position in the direction of the arrow 16, the lever 2 will swing clockwise, and such action may be effected by virtue of a spring connected with the transmission pin 8, force therefrom being imparted to the pin in the direction indicated by the arrow 17. This clockwise movement of the lever 2 will occur because the lever 4 which carries the pin 11 will be swung clockwise about the pin 10 as an axis, and the common axis 5 of the two levers will move upward, thereby resulting in the clockwise movement of the lever 2.

It will be understood that the right-to-left shifting of the cam 6 results in the follower pin 9 being permitted to have upward movement, thereby rendering effective the aforesaid spring action to which the transmission pin 8 is subjected.

The extreme left position of the cam 6 is as illustrated by the broken outline, wherein the speed setting of one second will be at the follower pin 9 and index mark 14. The lever 2 will now occupy the broken line position shown in the figure, and no further clockwise shifting of the lever 2 will occur.

It will thus be seen that the levers 2 and 4 shift clockwise simultaneously in response to the right-to-left movement of the cam 6.

With the proportions shown in Fig. 1, the extent of movement of the pin 11 is equivalent to the extent of movement of the pin 9. Thus, the transmission pin 8 will be shifted an extent which is equal to the difference in the height of the controlling cam 6 between the setting marks "500" and "1."

If now the controlling cam 7 is shifted in the direction of the arrow 18, (from right to left) the lever 4 will go through a further clockwise shifting in response to the spring force imposed on the transmission pin 8. When the cam 7 reaches the setting mark 2.8, that is, when such indicated mark is brought adjacent the index 15, the lever 4 will assume the broken line position of Fig. 1, and no further clockwise shifting of the lever 4 will occur.

Displacement of the setting members for the time and diaphragm may be carried out in any sequence and as often as one likes. The pin 11 of the lever 4 will always take a position corresponding to the exposure value dictated by the setting members. If the setting members for speed and diaphragm and their controlling cams 6 and 7 respectively are displaced in the same direction and by the same amount, the lever 4 and consequently the pin 11 will not change position, and therefore the tracing member of the exposure meter will be uninfluenced due to the transmission pin 8 remaining stationary.

Considering now the further application of the lever arrangement of Fig. 1, there is shown in Fig. 2 details of a shutter having such levers incorporated in it. The components illustrated in Fig. 1 have been given like characters in Fig. 2. At the side wall 1 of the shutter housing, the lever 2 is mounted by means of the screw 3 constituting the fixed axis of the lever. In Fig. 2 the common axis 5 of the levers is shown as constituted of a screw.

At the rear portion 1a of the housing wall 1 there is disposed a diaphragm setting ring 19 having a cylindrical flange or mantle 19a. On the mantle 19a there is fixed the cam 7, by means of suitable rivets or screws 20, such cam being disposed inside of the mantle.

At the front of the shutter structure there is rotatably mounted a speed-setting ring 21, Fig. 3, having a cylindrical flange or mantle 21a. The mantle 21a fixedly carries the cam 6, by means of suitable rivets or screws 20. The lever 2 is shown as having the pin 9 thereof engaged with the cam 6, such pin being movable vertically or radially with respect to the axis of the shutter structure. The lever 4 mounts the pin 10 thereof so that it engages the sloping edge of the cam 7, such pin also being arranged perpendicular to the shutter axis (or radially with respect thereto).

It will now be apparent that, by the above organization wherein the setting rings 21 and 19 are disposed respectively at the front and rear of the shutter structure and are provided with overlapping cylindrical mantles 19a and 21a having a space between them with the mantle 21a spaced from the side wall 1 of the shutter housing, a simple and advantageous construction ensues which may be simply carried out, and which will be saving of space as well as reliable and effective in its operation, with high accuracy. For example, no space will be required within the shutter housing, and at the same time there will be effected a completely closed exterior appearance of the shutter structure, with but small enlargement of the outer circumference. This is made possible because the lever and cam arrangement provided by this invention is extremely compact, and requires but little space radially of the shutter axis.

It will be noted in Fig. 2 that the transmission pin 8 (shown in broken outline) will extend in a direction parallel to the shutter axis, and such pin may be supported in a slide or bearings carried by the camera or by the shutter structure itself. In the latter case the bearing support may, for example, constitute a guide bushing disposed in the interior of the shutter structure. It will be noted that the pin 11 of the lever 4 extends from the lever radially inward or toward the shutter interior, to effect engagement with the end of the transmission pin 8, and the pin 11 may project through a suitable slot in the side wall 1 of the shutter housing, said slot being not drawn for the sake of clarity. To provide clearance for the pin 11, the lever 2 is provided with a slot or recess 2a.

With the transmission pin 8 supported by the camera, it could also project into the space enclosed by the side wall 1 of the shutter structure while still cooperating with the pin 11 in the manner above outlined. Also, the pin 8 could be disposed in the space provided between the side wall 1 of the shutter housing and the inside of the cylindrical mantle 19a, and with this organization the pin 11 may be made to project radially outward from the lever 4 which carries it, instead of radially inward.

The provision of the transmission pin 8 as a driving connection between the shutter structure and the exposure meter tracing member enables the present coupling device to be especially simple and advantageous. It will be understood, of course, that other types of driving connections may be provided between the lever 4 and the exposure meter, including either direct drive links, levers of one type or another, etc.

Referring to Fig. 2 it will be seen that a spring 22 is provided around the pivot screw 3, and a spring 23 provided on the pivot screw 5, such springs tending to maintain the follower pins 9 and 10 continually in engagement with the sloping edges of the cams 6 and 7 respectively. With such organization it is then not necessary to have the transmission pin 8 under the action of spring power, as previously mentioned.

Instead of the direct connection established by the pin 11 between the transmission pin 8 and the lever 4, other types of connections could be used, including cams or the like; in such event the tracing member of the exposure meter could be actuated by force supplied to the lever 4 as a consequence of the provision of the springs 22 and 23. Such springs, of course, would be brought into action in response to the adjusting movement of the controlling cams 6 and 7.

Referring to Fig. 3, the coupling device of this invention is shown as connected to an exposure meter 103 by means of the transmission pin 8. As shown, the pin 8 engages a lug 113a of a toothed segment 113 which is pivotally carried on an axis or pivot 114 secured to the camera housing. The lug 113a extends in a vertical direction with respect to the plane of the film which is disposed in the camera ready for exposure.

The segment 113 is under the action of a wire spring 115 arranged about the pivot 114, and the segment engages a gear 116 which is connected with a disk-shaped carrier segment 117 having fixedly secured thereto a ring 118.

Turnably carried by the ring 118 is a second ring 120, having manually engageable pins 119 by means of which it may be shifted for adjustment. The parts 118 and 120 constitute together the tracing member above referred to, and the ring 120 may be provided with a film sensitivity scale 121 which may be referred to an index mark 122 carried by the segment 117. Also, the ring 120 carries an index mark 123 cooperable with an indicator or pointer 125 of the measuring device of the exposure meter, said pointer being movable under a window 124. For obtaining a linear setting in the case of non-logarithmic characteristic of the measuring device, there is provided between the window 124 and the inner diameter of the ring 120 a channel scale 126, to which the index mark 123 and the pointer 125 may be referred.

On the cylindrical mantle 19a of the diaphragm setting ring 19 there is disposed a scale 130, and on the cylindrical mantle 21a of the speed setting ring 21 there is disposed a speed scale 131. Both scales may be referred to an index mark 132 fixed on the shutter structure. The usual type of front plate 24 may be utilized to cover the shutter structure at the front, and to secure the speed setting ring 21 in its operative position.

For the purpose of coupling the speed and diaphragm setting rings, any well known releasable coupling device may be provided, such device being not shown herein. The releasable coupling device may have a manually operable handle 25 disposed at the diaphragm setting ring 19. Normally, the setting rings 19 and 21 are coupled for simultaneous movement, and to release the rings for movement independently of each other the handle 25 is depressed or moved in a direction towards the shutter axis.

The adjustment of the camera shutter structure, in accordance with the indications of the exposure meter, is as follows:

(1) Setting the film sensitivity: For this purpose the ring 120 of the exposure meter is turned to cause the index mark 122 to indicate on the scale 121 the sensibility figure of the film being used.

(2) Setting the time diaphragm proportion corresponding to the exposure meter indication: After effecting the setting for the film sensibility, the release handle 25 is depressed, uncoupling the setting rings 19 and 21 from each other. Then, either the diaphragm setting ring 19 or the speed setting ring 21, as one likes, is turned until the index mark 123 on the ring 120 corresponds to the position of the measuring device pointer 125 as determined by the channel scale 126. Thus the time diaphragm proportion corresponding to the given light conditions and to the sensibility of the film being used is now adjusted, and the setting rings 19 and 21 may be coupled anew, by releasing the actuating handle 25. If, during such movement of a setting ring, it reaches one of its end positions without effecting coincidence between the index mark 123 and the pointer 125, then such coincidence must be effected by actuating the other setting ring in the required direction.

It will be understood that this actuation of the setting rings displaces the transmission pin 8 in the manner already described above, in connection with Fig. 1.

(3) Diaphragm-time selection: Selecting a diaphragm-time pair of values suitable for the subject which is to be photographed, may now be effected by turning the assemblage constituting the coupled setting rings, without actuating or depressing the handle 25. Such turning, as already described above, will not change the position of the transmission pin 8, and accordingly it will not change the position of the index mark 123.

It will be understood that in the above described embodiment of the invention the pair of levers 2, 4 is firmly pivotally supported on the side wall 1 of the shutter housing structure. Of course, the lever pair may be pivotally mounted on any other suitable support, as for example by a pivot secured to the well-known base plate of the shutter structure (not drawn) which serves to accommodate the shutter mechanism. Due to the small space required by the pair of levers 2, 4, such pair could be further arranged within the space enclosed by the side wall 1 of the shutter housing.

Considering Fig. 2 it will be understood that the cams 6 and 7 may be constituted as metal strips nesting within the inner walls of the cylindrical mantles 19a and 21a of the setting rings of the shutter structure. Therefore, the cams 6 and 7 may be fabricated as sheet metal stampings, and in consequence of this the coupling device of the present invention may be inexpensively and advantageously manufactured.

It will now be appreciated that from a consideration of the above structure the various components and assemblies constituting the improved coupling device of this invention may be easily, quickly and economically fabricated. As distinguished from prior devices intended for this purpose, the present invention provides important advantages, where an intra-lens shutter is to be coupled with an exposure meter. Moreover, the coupling device of the invention is extremely reliable in its operation, and provides a highly desirable accuracy as a consequence of the speed and diaphragm setting members being coupled to the tracing member of the exposure meter by virtue of the cam and lever organization, together with the axially movable transmission member.

Variations and modifications may be made within the scope of the claims, and portions of the improvements may be used without others.

I claim:

1. In a photographic camera having an intra-lens shutter structure provided with a diaphragm-setting member and a shutter-speed setting member, and having an exposure meter provided with a tracing member, a first lever pivotally mounted on a fixed part of said shutter structure; a second lever pivotally mounted on said first lever; transmission means between said second lever and the said tracing member to effect actuation of the latter in response to movement of the second lever; transmission means between one lever and the diaphragm-setting member for effecting actuation of the lever in response to movement of the member; and transmission means between the other lever and the shutter-speed setting member for effecting actuation of the other lever in response to movement of said speed setting member.

2. The invention as defined in claim 1 in which the transmission means between the levers and the setting members comprise cams carried by said members and arranged to engage the said levers.

3. The invention as defined in claim 2 in which the setting members comprise rings coaxially supported with respect to the axis of the shutter structure, one ring being disposed at the front and the other at the rear of said shutter structure, in which there are cylindrical mantles connected with said rings and overlapping the circumference of the shutter structure, and in which the said cams are disposed in the space located between the cylindrical mantles and the shutter structure.

4. The invention as defined in claim 2 in which there are springs engageable with the said levers, biasing the same to hold them in engagement with the said cams.

5. The invention as defined in claim 2 in which there are cylindrical pins carried by the levers and extending generally radially with respect to the axis of the shutter structure, said pins being engageable with the said cams.

6. The invention as defined in claim 1 in which the transmission means between the second lever and the tracing member comprises an elongate, longitudinally-movable transmission member movably carried by the camera and engaging the said tracing member.

7. The invention as defined in claim 6 in which the transmission member comprises a pin extending parallel to the axis of the shutter structure and movable in opposite directions parallel to said axis.

8. The invention as defined in claim 7 in which the said second lever has a cylindrical pin affixed to it and adapted to engage the said transmission pin, said cylindrical pin being disposed generally radially with respect to the axis of the shutter housing.

9. The invention as defined in claim 1 in which the said first lever is a one-armed lever, and in which the said second lever comprises a two-armed lever at one end engaging the transmission means between the lever and the tracing member and at the other end engaging the transmission means between the lever and the speed setting member.

10. The invention as defined in claim 1 in which there are means for releasably coupling the diaphragm and shutter speed setting members to each other for either concurrent or independent movements.

References Cited in the file of this patent

UNITED STATES PATENTS

| | | |
|---|---|---|
| 2,252,573 | Leitz et al. | Aug. 12, 1941 |
| 2,305,294 | Kuppenbender | Dec. 15, 1942 |
| 2,418,370 | Simmon | Apr. 1, 1947 |

FOREIGN PATENTS

| | | |
|---|---|---|
| 756,282 | Germany | Feb. 23, 1953 |
| 1,111,448 | France | Oct. 26, 1955 |